United States Patent
Helfman et al.

(10) Patent No.: US 7,668,112 B2
(45) Date of Patent: Feb. 23, 2010

(54) METHOD FOR APPLICATION MODELING

(75) Inventors: Nadav Binyamin Helfman, Binyamina (IL); Nathan Ari, Zoran (IL); Shai Shermister, Raanana (IL)

(73) Assignee: SAP Portals Israel Ltd., Ra'anana (IL)

(*) Notice: Subject to any disclaimer, the term of this patent is extended or adjusted under 35 U.S.C. 154(b) by 592 days.

(21) Appl. No.: 11/496,110

(22) Filed: Jul. 31, 2006

(65) Prior Publication Data

US 2008/0027972 A1     Jan. 31, 2008

(51) Int. Cl.
*H04J 1/16* (2006.01)
*H04L 12/56* (2006.01)

(52) U.S. Cl. .................. 370/252; 370/241; 370/386

(58) Field of Classification Search ............ 370/252, 370/241, 386, 389; 709/223
See application file for complete search history.

(56) References Cited

U.S. PATENT DOCUMENTS

| | | | |
|---|---|---|---|
| 2006/0190236 A1* | 8/2006 | Malloy et al. | 703/22 |
| 2007/0106778 A1* | 5/2007 | Zeldin et al. | 709/223 |
| 2009/0182868 A1* | 7/2009 | McFate et al. | 709/224 |

* cited by examiner

*Primary Examiner*—John Pezzlo
(74) *Attorney, Agent, or Firm*—Buckley, Maschoff & Talwalkar LLC (57) ABSTRACT

A method for modeling an application, by generating a message comprising random contents according to parameters related to the application. The message is introduced into a network or a simulation thereof and the performance of the application in the distributed landscape is evaluated.

26 Claims, 5 Drawing Sheets

FIG. 1

```
201
202    <xml>
203     <message>
204      <size>
205       <min>25000</min>
206       <max>128000</max>
207      </size>
208      <weight>
209       <string_groups>30</string_groups>
210       <alphabet>40</alphabet>
211       <protostrings>30</protostrings>
212      </weight>
213     </message>
214
215     <string_groups>
216      <min_ttl>1000000</min_ttl>
217      <max_ttl>1000000</max_ttl>
218      <min_string_len>140</min_string_len>
219      <max_string_len>12048</max_string_len>
220      <min_strings_count>10</min_strings_count>
221      <max_strings_count>50</max_strings_count>
222      <min_string_weight>1</min_string_weight>
223      <max_string_weight>1</max_string_weight>
224      <min_groups_count>1</min_groups_count>
225      <max_groups_count>1</max_groups_count>
226     </string_groups>
227
228     <alphabet>
229      <alpha>    <symbol>a</symbol>  <weight>9</weight>   </alpha>
230      <alpha>    <symbol>b</symbol>  <weight>3</weight>   </alpha>
231      <alpha>    <symbol>c</symbol>  <weight>3</weight>   </alpha>
232      <alpha>    <symbol>0</symbol>  <weight>1</weight>   </alpha>
233      <alpha>    <symbol>1</symbol>  <weight>1</weight>   </alpha>
234      <alpha>    <symbol>2</symbol>  <weight>1</weight>   </alpha>
235      <alpha>    <symbol>
</symbol>  <weight>5</weight>   </alpha>
236     </alphabet>
237     <protostrings>
238        <str> <data><IFRAME src="http://www.google.com">
239             </IFRAME></data> <weight>50</weight> </str>
240        <str> <data></a></data> <weight>10</weight> </str>
241        <str> <data><imgxsrc="imagexgif"></data> <weight>8</weight> </str>
242        <str> <data><p></data> <weight>10</weight> </str>
243     </protostrings>
244    </xml>
245
```

METHOD FOR APPLICATION MODELING

BACKGROUND OF THE INVENTION

1. Field of the Invention

The present invention relates to a method and apparatus for modeling computerized applications intended for distributed environments according to different relevant attributes, thus eliminating the need to relate to actual contents associated with of the application.

2. Discussion of the Related Art

Distributed environments typically provide users with access to multiple applications, and should aim at enabling overall optimal performance. A distributed environment typically comprises one or more servers, residing in one or more data centers, one or more (typically in the hundreds or thousands) users, and a communication channel, typically a distributed landscape, such as a wide area network (WAN). The performance of each application relies on the characteristics and resource requirements of the application itself, as well as on the network transportation generated by that application and additional ones, and on the environment characteristics, including the physical equipment, load, optimization applications used and additional factors. When an application is being developed, it is desirable to evaluate its performance prior to deployment time. Such evaluation is required for the manufacturer both as part of the development and optimization process, and in order to inform future users about the recommended hardware and software environments and expected performance. However, it is often the case that before application development has reached an advanced stage, the application's performance on a distributed application delivery infrastructure can not be assessed, thus creating a deadlock. Additional need arises from network equipment vendors or network managers, wishing to optimize the usage of a network. However, without specific information related to applications expected to run in the environment, and their behavior, such optimization or information can not be established. When the time comes for deployment for an application or a network, it is usually too late or too expensive, both financially and reputation-wise for significant changes either in the application or in the network. When deployment time arrives, a network vendor or operator may be required to supply additional hardware so that one or more applications will exhibit acceptable performance, if at all possible. Alternatively, the application developer might try to introduce changes to the application, which might hold back deployment time, require significant manpower and resources, and be sub-optimal relatively to changes introduced at an earlier stage.

There is therefore a need for an apparatus and method for modeling the behavior of an application running in a distributed environment without relating to the actual contents of the application. This will enable both the application and networks expected to run the application, to be enhanced or prepared to provide improved performance.

SUMMARY OF THE PRESENT INVENTION

It is an object of the present invention to provide a novel method for modeling the behavior of an application, by generating messages having similar characteristics to messages generated by the application, and simulating an execution of the application by introducing the generated messages into an environment and testing the resulting performance.

In accordance with the present invention, there is thus provided a method for generating one or more messages associated with one or more applications, said messages associated with one or more characteristics, the method comprising the steps of: selecting a value for one or more characteristics from the one or more characteristic associated with the at least one message; selecting a type for one or more components to be generated; and generating the components by randomly generating a value associated with the type; whereby the message is made of the one or more components. Within the method, each of the at least one type is optionally associated with a predetermined weight and with an at least one parameter or an at least one element. Within the method, the characteristic associated with the message can relate to a length associated with the message. The characteristic can also relate to one or more of the group consisting of a time of day, a date, a user, a usage pattern, a role of a user, or a number of round-trips. Optionally, the at least one component of the type comprise one or more elements associated with the type. Optionally, the type belongs to the group consisting of: a random alphanumeric character type; a random alphanumeric string type; a group of random alphanumeric strings type; or a predetermined protocol string type. Within the method, an element of the random alphanumeric string type or the random alphanumeric character type can be associated with a time to live, a length, or a weight; an element of the group of random alphanumeric strings type can associated with a time to live, a length, or a weight. An element of the predetermined protocol string type can be associated with one or more predetermined strings, and a predetermined weight. Within the method, the application is designed to run in a distributed landscape. The distributed landscape is optionally a distributed network. The application is optionally an enterprise application. The method can further comprise a step of using the one or more messages in a simulation of the running of the application. Optionally, the simulation is performed in a distributed landscape, the distributed landscape comprising: one or more servers, one or more clients and a wide area network. The simulation can be performed in a distributed landscape, the distributed landscape comprising: one or more server emulations, one or more client emulations or a wide area network emulation. The method can further comprise a step of storing the one or more message on a storage device. Optionally, the method comprises the steps of storing information about exceptional behavior of the application. The stored messages can be loaded from the storage device.

Another aspect of the disclosed invention relates to a method for simulating the execution of one or more applications, the method comprising the steps of: receiving one or more parameters associated with the applications; generating one or more messages associated with the applications according to the parameters; and introducing the messages into a network or network emulation. The method can further comprise the step of evaluating one or more performance parameters associated with the application, or of fine tuning one or more tools, such as an optimization tool or an acceleration tool.

Yet another aspect of the disclosed invention relates to a computer readable storage medium containing a set of instructions for a general purpose computer, the set of instructions comprising: receiving one or more one parameters associated with one or more applications; generating one or more messages associated with the applications according to the parameters; and introducing the messages into a network or network emulation.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

The present invention provides a novel method and apparatus for modeling the behavior of an application, thus enabling the emulation and prediction of the application performance over a distributed infrastructure, by using an application performance model based on the application's characteristics rather than running the actual application. Modeling the application can eliminate or postpone intensive development effort or simulating complex use cases. The disclosed invention generates random contents based on the characteristics of the content expected to be generated or consumed by the application. The random contents are comprised of: random alphanumeric characters, random alphanumeric strings (not necessarily textual strings) repeating for a predetermined time and then disappearing, and known strings expected to appear repeatedly in the input or output of the application. The weights of elements of the three groups, and the relative weight of elements within each group are set according to their expected frequency in the application. The application modeler indicates a number of factors relevant to the application, the factors may include one or more of the following: 1. The expected range or distribution of the length of a message sent or received by the application. 2. The relative weight of each of the three groups: random alphanumeric characters, random alphanumeric strings repeating in a predetermined life time, and fixed strings, for example protocol strings which are typical to a protocol used for sending or receiving a message. 3. Expected number of application level round trips consisting of query and response from a client to a server and back, required for handling a message. A protocol string can include activation of additional application round trip, for example if HTTP is used in the modeling. A protocol string can include a link to another dynamic page which is displayed in an http frame. 4. Expected delay or response time by the application to a query. 5. A role or a user definition: the abovementioned parameters relating to a message, may be specific to one or more users in an organization, or to one or more roles in an organization. For example, queries or other messages typically issued by a sales person are likely to differ from queries issued by a technical support person. 6. Time, date or other pattern-related parameters: certain queries are more typical to a certain time or date. For example a status report is more likely to be sent at the beginning or end of a working day, while an update request is more typical to regular working hours, a monthly report is likely to be issued at the beginning or end of a month, and similar considerations. Once the parameters of a model are set using all or part of the abovementioned parameters, and optionally additional ones, a generator generates one or more message according to the parameters, the messages are then used in simulating a run of an application, which enables the total response time inspection, bottle necks analysis, required infrastructure and the like. The generated messages can be output by a dedicated application that merely contains the random generator, instead of a real application. Alternatively, the messages can be introduced into the distributed landscape, such as the network, using an injection or another mechanism. The application can be simulated in a real distributed environment, comprising components such as servers, clients, a distributed landscape such as a wide area network (WAN), optimizers and others. Alternatively, the application model can be tested in a fully or partially simulated environment, including a simulated server, such as a dedicated portlet for an enterprise Portal, a simulated client, such as a corresponding script for Load Runner manufactured by Mercury (http://www.mercury.com), or a distributed landscape emulation, such as a WAN emulation, such as Shunra VE desktop manufactured by Shunra (www.shunra.com). Another use to randomly generated contents can be made by network equipment providers or network operators. Such users can run their system using diverse types of random contents having characteristics similar to messages generated by a variety of applications and having different compositions, in order to locate bottle necks and ensure adequate performance on various applications. In all these applications, the performance of the application is evaluated, in order to predict future performance or to assess the performance of a distributed landscape or a component thereof.

Figure 1:
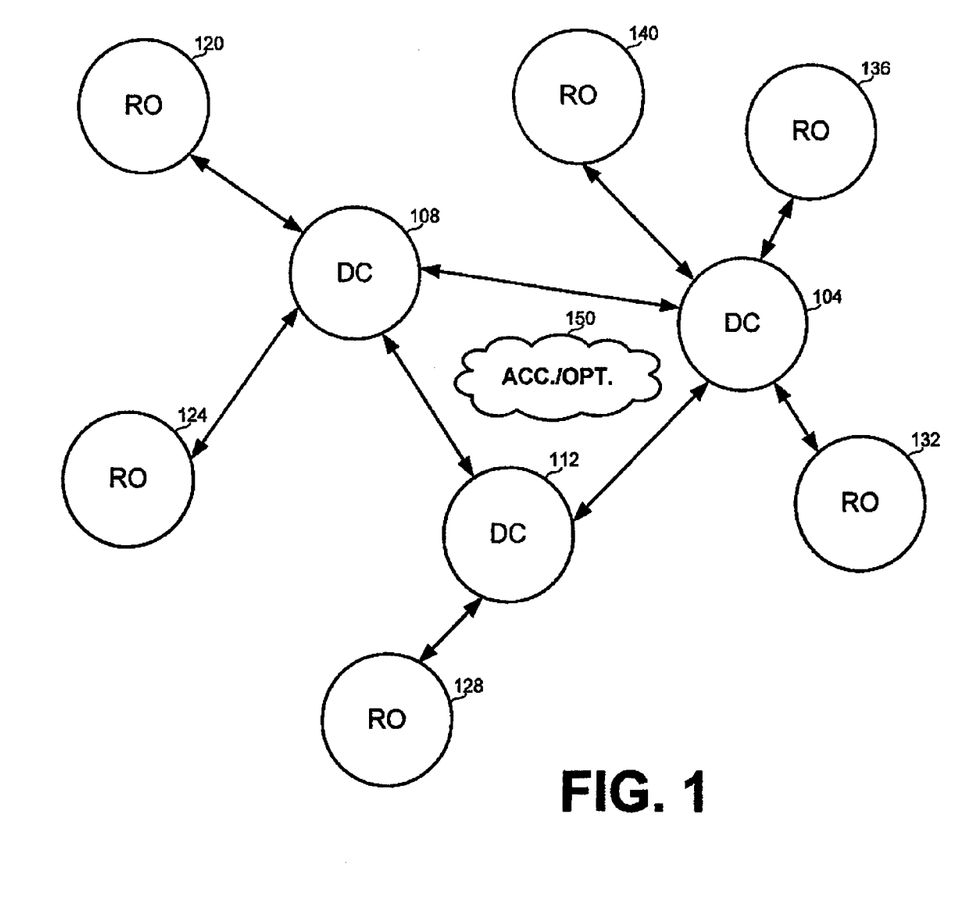
FIG. 1 is a schematic illustration of a typical environment for running applications modeled in accordance with a preferred embodiment of the disclosed invention.

Referring now to FIG. 1, a schematic illustration of a distributed landscape running one or more applications, typically a distributed landscape employed by a large organization, wherein multiple users in diverse geographic locations are using the application. The infrastructure comprises one or more data centers such as 104, 108 or 112. A data center is a geographical location in which multiple computing platform such as personal computers, mainframe computers or others are located, taken care of by skilled personnel, and providing services to multiple distributed remote locations and users. The services are preferably consumed from remote appliances, usually but not limited to personal computers or network computers used by servers, residing at, or connected to a regional office, such as 120, 124, 128, 132, 136 or 140. Each regional office is connected to one or more data centers, from which it receives services. The data centers and regional offices are preferably connected through a distributed landscape. Optionally, there may be one or more acceleration/optimization components 150, which are typically software components designed to accelerate performance of one or more applications, by compressing data, avoiding redundant rounds trips, caching or other techniques. Acceleration/optimization components 150 reside on the same or on different computing platforms than the ones the applications run on.

Figure 2:
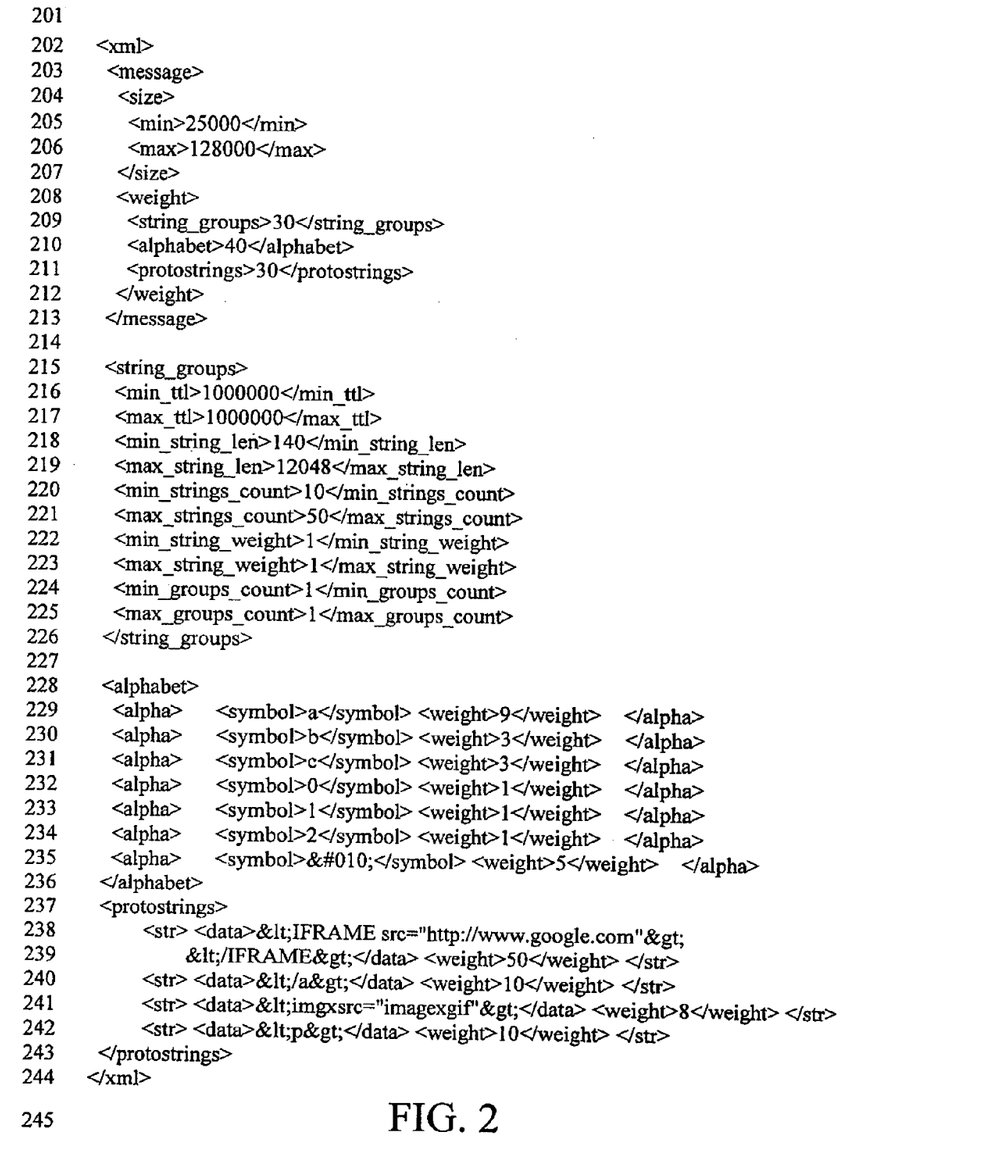
FIG. 2 is a listing of an exemplary text file showing the modeling of an application, in accordance with the preferred embodiment of the present invention.

Referring now to FIG. 2, showing a shortened listing of a file describing a model of an application. In accordance with a preferred embodiment, the description of a message associated with an application is described as an XML file, but any other descriptive format, which preferably supports a hierarchical structure can be used as well. The description of a message preferably includes an indication in lines 204-207 for the message size and message size distribution. In lines 204-207, the assumed distribution is a uniform distribution, which is the default. The user specifies minimum (line 205) and maximum (line 206) values for the distribution. If other distribution types are expected, such as Gaussian, Poisson, or others, the relevant parameters are to be supplied for that distribution. The XML message further comprises lines 208-212, designating the weights assigned to random strings, as indicated in line 9, random alphanumeric characters as indicated in line 210 and known strings as indicated in line 211. The weights assigned to the three groups can sum up to 100 as shown in lines 209-211, or another predetermined number, or the relative weights of the different types can be used to set their relative frequency. Lines 215-226 show parameters relevant for random strings, including minimal or maximal time to live (TTL) at lines 216-217, parameters relevant for the distribution of the string length lines 218-219, parameters relevant for the number of random strings used lines 220-221, parameters relevant for the weight distribution of the strings lines 222-223 and parameters relevant for groups of strings lines 224-225. TTL parameters are particularly useful for example, in an application involving customer service, wherein an agent or another person is working for a certain amount of time on a certain customer's file, and possibly repeating the customer's name for a number of times, and then switches to another customer. The string representing the customer's name, or another parameter, is to be kept alive for a period between the minimal and maximal TTL which is the expected time the agent will finish handling the customer's records. In addition to pure random generation of strings, the strings may be selected in a random or non-random manner from a string source such as one or more data base tables used by the application. Lines 228-236 show the relative weight to be assigned to random alphanumeric character. The shortened example of FIG. 2, shows only the relative weight assigned to the characters 'a' to 'c' (lines 229-231), the digits '0' to '2' (lines 232-234) and the new line character (line 235) whose ASCII code is 010. The other characters, for example 'd' to 'z' can be assumed to have a default weight, or to be unacceptable in a message relevant to the specific application. Lines 237-243 show the constant strings to be used in the application, and their relative weight. For example, the string "</a>" is to be used with a weight of 10, as indicated in line 240, relatively to the other strings mentioned. In addition to the content types and parameters shown in the listing of FIG. 2, additional types or additional parameters related to the application can be introduced.

Figure 3:
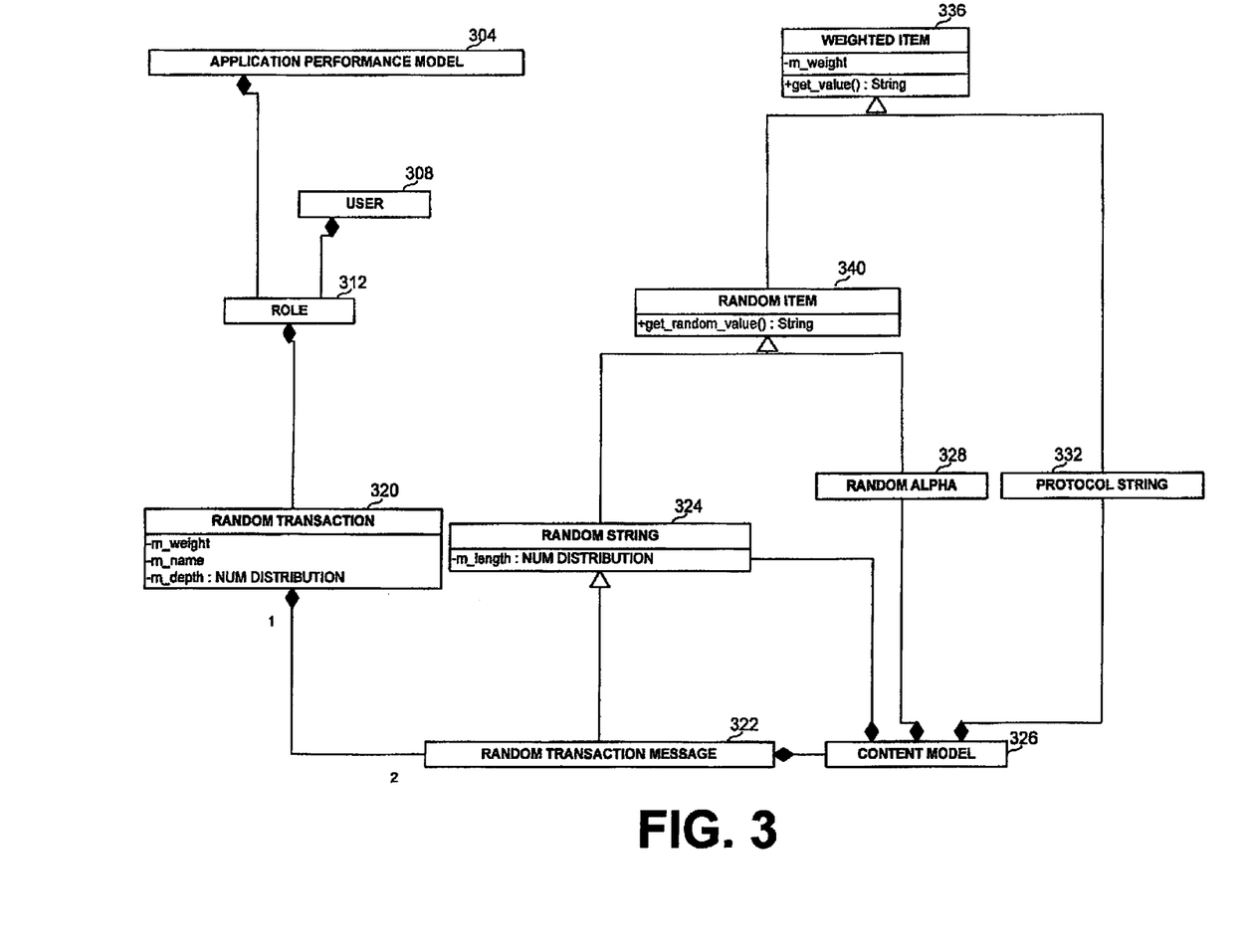
FIG. 3 is a class diagram, showing the classes used in the preferred embodiment of the present invention.

Referring now to FIG. 3, showing a Unified Modeling Language (UML) class diagram of the objects associated with an object-oriented implementation of the random content generation. The goal of the generation process is to prepare an object of type application performance model 304, according to parameters supplied by a user. Application performance model 304 may relate to one or more roles 312, wherein each role 312 may be referred to by one or more users 308. Each role 312 comprises one or more random transactions 320, wherein each transaction 320 is made of two random transaction messages 322, one message for a request and another for a reply. A transaction may involve several application servers. Therefore, in order to emulate a realistic behavior, random strings may comprise links to transactions in additional, possibly emulated, application servers. Each message 322 optionally comprises one or more random alphanumeric strings 324, one or more random alphanumeric characters 328 and one or more protocol strings 332, as detailed in association with FIG. 2 above. Random alpha object 328 and random string object 324 inherit from random item object 340, which supports a get_random_value method for generating a random value. Both random item object 340 and protocol string 332 inherit from weighted item 336, which comprises a weight field and a get_value method. Each of random string alphanumeric 324, random alphanumeric character 328, and protocol string 332 is responsible for generating and keeping one instance of a random string, a random character, or a protocol string, respectively, according to the weights and lengths as defined by the user for the relevant object type. Content model 326 is responsible for generating one object of any of the three types: random string, random alpha or protocol string according to the relative weights set by a user. Random transaction message 322 is responsible for preparing and keeping a message comprised of elements of the various types, according to the element distribution and length distribution set by the user.

Figure 4:
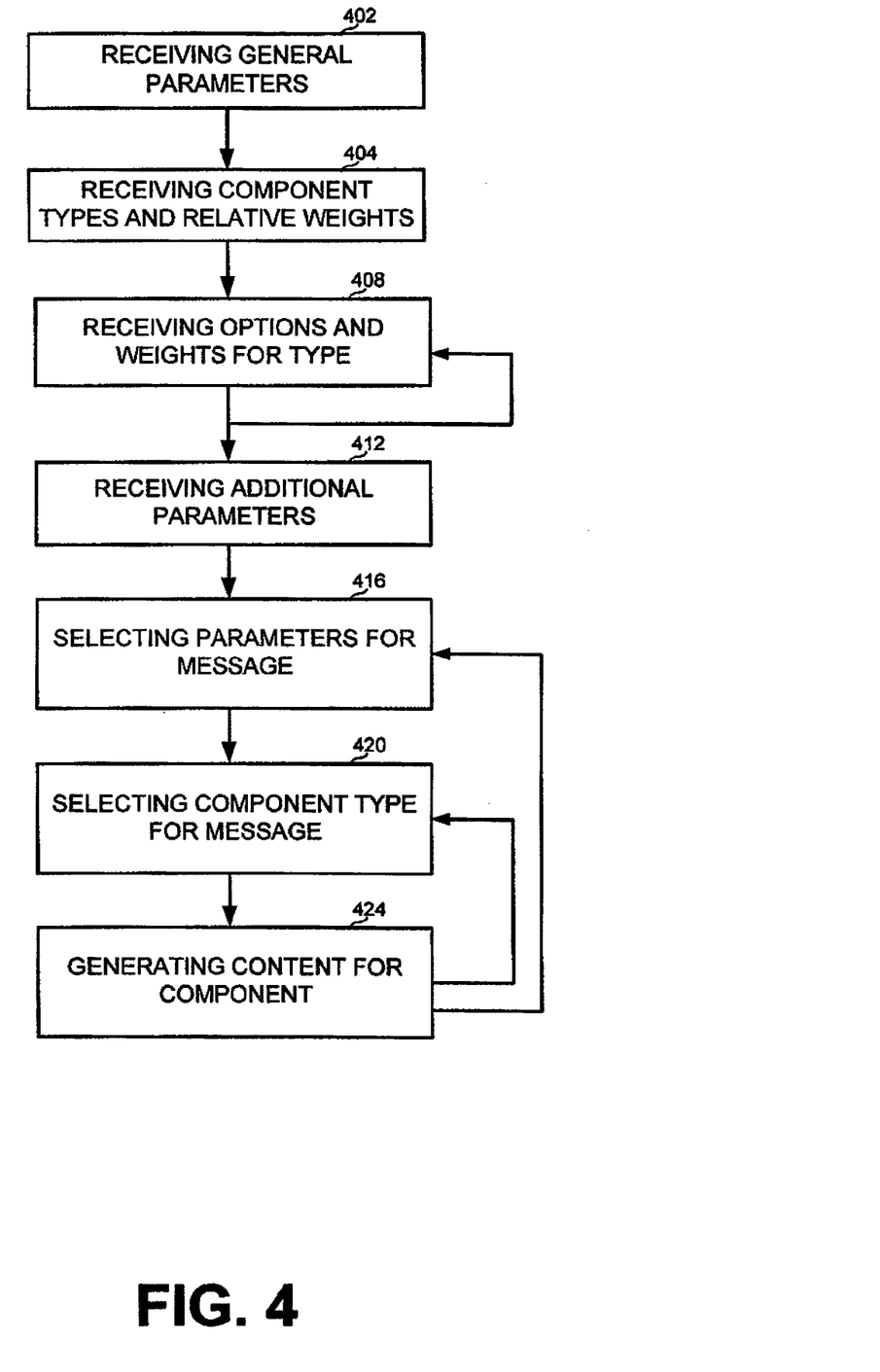
FIG. 4 is a flowchart listing the main steps associated with generating a message, in accordance with the preferred embodiment of the present invention.

Referring now to FIG. 4, showing a preferred embodiment of generating content for an application. At step 402, an apparatus, preferably a computing platform designed to perform the method of the disclosed invention receives the relevant characteristics for a message generated or consumed by an application, including for example message length distribution characteristics, number of round trips distribution characteristics, or the like. At step 404 the apparatus receives the relevant component types and weights typical to a model. The information can be received after it was previously created and stored by a user at a preliminary stage. The types can include, as detailed above, random alphanumeric characters, random alphanumeric strings and string groups, expected protocol strings, and additional groups, and the relative weight of each type. At step 408, for each type obtained at step 404, the apparatus receives the relevant parameters. For example, in a random alphanumeric character type, the parameters can be the letters or digits expected to appear and their relevant weights or frequencies. Step 408 repeats for all types obtained in step 404. At step 412 additional parameters are received, such as relevant time or date for the information retrieved at steps 404 and 408, role or user definitions for the information, or the like. At step 416, a set of parameters is selected for an actual message to be created, including for example the message length, in accordance with the message length distribution characteristics obtained at step 402. At step 420, a component type is selected for the message, in accordance with the available types and their relative weights obtained at step 404. For example, a random alphanumeric character can be selected. Then, at step 424, the actual contents of the component are generated, according to the parameters obtained at step 408 for the component type. For example, the character 'g' can be selected if the component is of a random alphanumeric character type. Steps 420 and 424 continue until the message length determined at step 416 is achieved. Steps 416, 420 and 424 repeat until the required number of messages, according to the number of round trips is achieved. Regarding steps 416, 420, and 424 the selection of a parameter, a type, or a specific component can be performed, for example by employing an object of class RandomObjectTree. A RandomObjectTree object contains a tree of objects wherein each leaf contains an integer representing the weight of the object, and data representing the contents associated with the object. The RandomObjectTree object selects a random leaf according to the relative weights.

Figure 5:
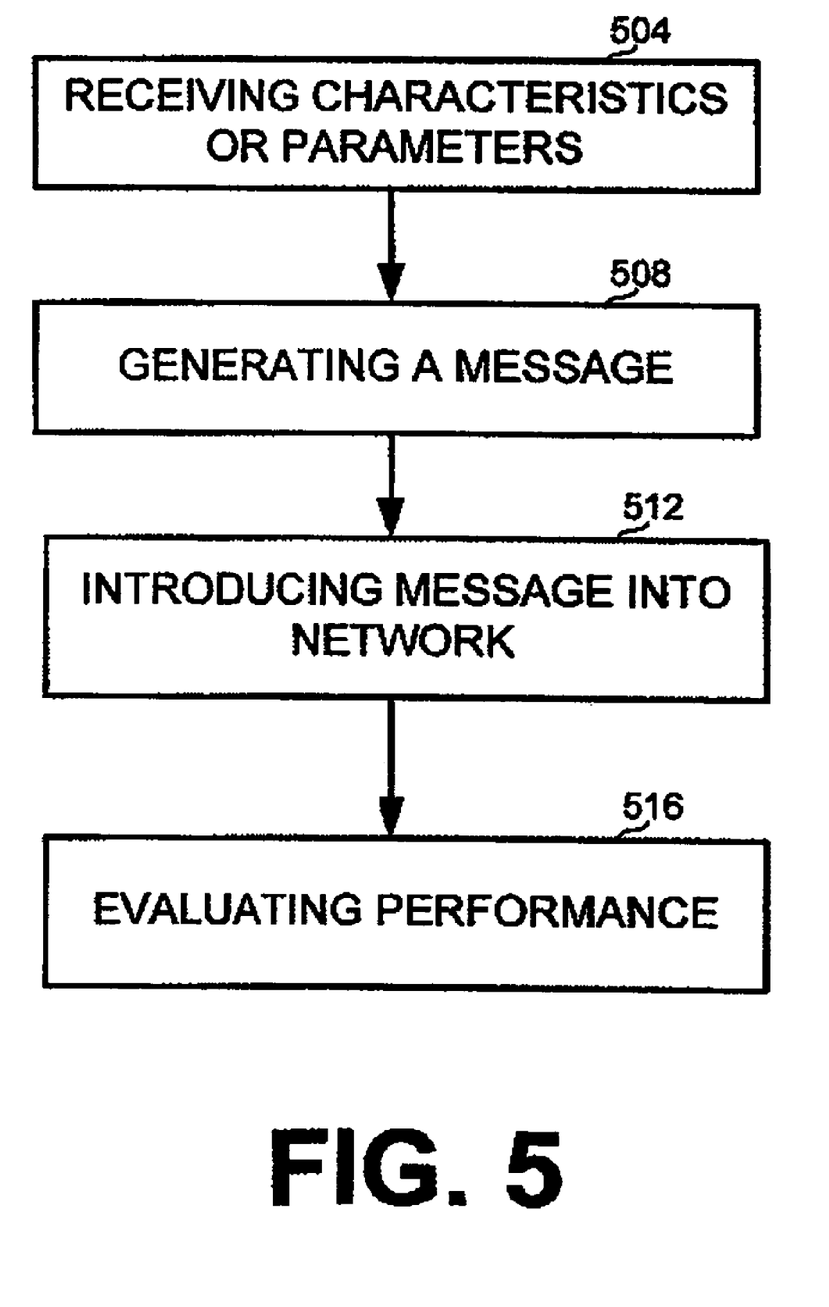
FIG. 5 is a flowchart listing the main steps associated with simulating a run of an application on a distributed landscape, in accordance with the preferred embodiment of the present invention.

Referring now to FIG. 5, showing a preferred embodiment of using the method of the disclosed invention. At step 504, characteristics or parameters describing one or more messages related to one or more applications are received. The characteristics or parameters are detailed in association with steps 402, 404, 408 and 412 of FIG. 4 above. At step 508, a message is generated according to the characteristics received at step 502. At step 512 the message is introduced into a distributed landscape. The introduction can be achieved through a dedicated application generating and issuing the message, through direct injection, or any other technique. The distributed landscape can comprise any combination of the following: one or more clients, one or more servers, a wide area network, one or more optimizers, or one or more accelerators. Alternatively, one or more components of the distributed landscape can be replaced with emulations, such as a client emulation, a server emulation, a distributed landscape emulation, or the like. At step 516 the performance of the application, the distributed landscape a component thereof, or any combination of the above is evaluated. The performance is evaluated, for each application transaction type, by response time statistics, including parameters such as average, minimum or maximum time, standard deviation or the like) for each scale (i.e. size of the network) and distributed landscape condition, including parameters such as bandwidth, latency, utilization, type of optimization infrastructure used.

The evaluated performance can be used to predict the performance of the application, once the application itself is operative, to predict the behavior of the distributed landscape when additional applications to those currently running will be introduced, or the like.

An additional option relates to storing and later loading an existing model. When a model of an application was generated and run, and later the application itself proved that the model provided the user with satisfactory evaluation of the behavior, the user can store the model in a storage device for future usages. The model can be then loaded from the storage device and used, for example in an environment which is similar to the environment in which the application model was initially tested. Further enhancements to the stored model can be applied. For example, it is possible to store with the model, indications to exceptionally good or bad performance, resulting from a temporary connection to external data servers, from which the application has to retrieve a large amount of information. Thus, when the model will be run in a different environment it will be possible to take the temporary changes into account.

The disclosed method provides a novel approach to modeling one or more applications for purposes such as testing the application performance on one or more configurations of distributed landscape. The method uses predetermined characteristics or characteristics distributions, and predetermined types of components within each message, in order to construct one or more messages. Such messages represent messages that can be exchanged by the actual application, and thus enables performance testing for such application without requiring the actual application.

It will be appreciated by persons skilled in the art that the presented method can be used to predict the behavior of an application during the modeling of an application, for example when the general shape of the messages exchanged between clients and servers is already known but before such application is ready for testing. Alternatively, the method can be used off line in an operative environment to separate the network performance from the contents of one or more applications, or to monitor a network in real time, when the network is loaded to a certain degree, and an operator is trying to predict the effect of additional applications running on the same network. In yet another alternative, the method can be used to test the efficiency of, or to fine-tune various optimization or acceleration tools, such as compressing and decompressing tools. Various models can be created and stored, for example in a database, and then reloaded and reused when conditions such as network structure, expected number of users or the like, change. In any of these cases, the performance is tested, measured or otherwise evaluated in order to deduce conclusions about future performance of an application, network load, or others.

Data for characterizing applications, including message size distribution, nesting levels and contents can either be determined arbitrarily (which is most useful for testing a wide variety of behaviors) or analyzed from existing messages associated with an application.

It will be appreciated by persons skilled in the art that the present invention is not limited to what has been particularly shown and described hereinabove. Rather the scope of the present invention is defined only by the claims which follow.

We claim:

1. A method for generating an at least one message associated with an at least one application, and at least one characteristic, the method comprising the steps of:
   selecting an at least one characteristic associated with the at least one message;
   selecting an at least one type for an at least one component to be generated;
   generating the at least one component by randomly generating a value associated with the at least one type and the characteristic; and
   introducing the message into a network or network emulation for testing an at least one parameter associated with network performance of the at least one application,
   whereby the at least one message comprises the at least one component.

2. The method of claim 1 wherein each of the at least one type is associated with a predetermined weight, and with an at least one parameter or an at least one element.

3. The method of claim 1 wherein the at least one characteristic associated with the at least one message relates to a length associated with the at least one message.

4. The method of claim 1 wherein the at least one characteristic associated with the at least one message relates to one or more of the group consisting of: a time of day, a date, a user, a usage pattern, a role of a user, or a number of round-trips.

5. The method of claim 1 wherein the at least one component of the at least one type comprises an at least one element associated with the at least one type.

6. The method of claim 1 wherein the at least one type belongs to the group consisting of: a random alphanumeric character type; a random alphanumeric string type; a group of random alphanumeric strings type; or a predetermined protocol string type.

7. The method of claim 6 wherein an element of the random alphanumeric string type is associated with a time to live, a length, or a weight.

8. The method of claim 6 wherein an element of the group of random alphanumeric strings type is associated with a time to live, a length, or a weight.

9. The method of claim 6 wherein an element of the random alphanumeric character type is associated with a predetermined character and a predetermined weight.

10. The method of claim 6 wherein an element of the predetermined protocol string type is associated with an at least one predetermined string, and a predetermined weight.

11. The method of claim 1 wherein the at least one application is designed to run in a distributed landscape.

12. The method of claim 11 wherein the distributed landscape is a distributed network.

13. The method of claim 1 wherein the at least one application is an enterprise application.

14. The method of claim 1 further comprising a step of using the at least one message in a simulation of the at least one application.

15. The method of claim 14 wherein the simulation is performed in a distributed landscape, the distributed landscape comprising: an at least one server, an at least one client and a wide area network.

16. The method of claim 14 wherein the simulation is performed in a distributed landscape, the distributed landscape comprising: an at least one server emulation or an at least one client emulation or a wide area network emulation.

17. The method of claim 1 further comprising a step of storing the at least one message on a storage device.

18. The method of claim 17 further comprising the step of storing information about exceptional behavior of the at least one application.

19. The method of claim 17 further comprising the step of loading the at least one message from the storage device.

20. The method of claim 1 wherein the at least one component is generated in accordance with a statistical characteristic of the component.

21. A method for simulating the execution of an at least one application, the method comprising the steps of:
   receiving an at least one parameter associated with the at least one application;
   generating an at least one message associated with the at least one application according to the at least one parameter, the at least one message having a randomly generated component; and
   introducing the at least one message into a network or network emulation for testing an at least one parameter associated with network performance of the at least one application.

22. The method of claim 21 further comprising a step of evaluating an at least one parameter associated with network performance of the at least one application.

23. The method of claim 21 further comprising a step of fine-tuning an at least tool.

24. The method of claim 23 wherein the tool is an optimization tool or an acceleration tool.

25. The method of claim 21 wherein the at least one message is generated based on a statistical characteristic of the at least one message.

26. A computer readable storage medium containing a set of instructions being executed by a general purpose computer, the set of instructions comprising:
   receiving an at least one parameter associated with an at least one application;
   generating an at least one message associated with the at least one application according to the at least one parameter, the at least one message having a randomly generated component; and
   introducing the at least one message into a network or network emulation for testing an at least one parameter associated with network performance of the at least one application.

* * * * *

UNITED STATES PATENT AND TRADEMARK OFFICE
CERTIFICATE OF CORRECTION

| | |
|---|---|
| PATENT NO. | : 7,668,112 B2 |
| APPLICATION NO. | : 11/496110 |
| DATED | : February 23, 2010 |
| INVENTOR(S) | : Helfman et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 799 days.

Signed and Sealed this

Seventh Day of December, 2010

David J. Kappos
*Director of the United States Patent and Trademark Office*